United States Patent
Van Egmond

[11] Patent Number: 5,511,904
[45] Date of Patent: Apr. 30, 1996

[54] STORM WATER INFILTRATION

[76] Inventor: John Van Egmond, 174 Poplar Ave., Acton, Ontario, Canada, L7J 2E4

[21] Appl. No.: 98,277

[22] PCT Filed: Feb. 5, 1992

[86] PCT No.: PCT/CA92/00042

§ 371 Date: Aug. 3, 1993

§ 102(e) Date: Aug. 3, 1993

[87] PCT Pub. No.: WO92/14005

PCT Pub. Date: Aug. 20, 1992

[30] Foreign Application Priority Data

Feb. 6, 1991 [CA] Canada ................................ 2035753

[51] Int. Cl.$^6$ .................................................. E02B 13/00
[52] U.S. Cl. .............................. 405/52; 210/164; 210/165; 405/36
[58] Field of Search ...................... 405/36, 52; 52/19–21; 210/307, 163–165

[56] References Cited

U.S. PATENT DOCUMENTS

| | | | |
|---|---|---|---|
| 122,209 | 12/1871 | Ashman et al. | 210/163 |
| 530,816 | 12/1894 | Wright | 210/307 X |
| 1,749,878 | 3/1930 | Fleming | 210/165 |
| 2,048,140 | 7/1936 | Renfrew et al. | 210/307 X |
| 2,615,526 | 10/1952 | Lane | 210/164 |
| 3,037,631 | 6/1962 | Drehmann | 210/165 |
| 4,199,272 | 4/1980 | Lacey . | |
| 4,419,232 | 12/1983 | Arntyr et al. | 210/164 |
| 4,520,852 | 6/1985 | Klein | 52/19 X |
| 4,957,389 | 9/1990 | Neathery | 52/20 X |
| 5,037,541 | 8/1991 | Ruey-Jang et al. | 210/165 X |
| 5,284,580 | 2/1994 | Shyh | 210/307 X |
| 5,297,367 | 3/1994 | Sainz | 52/20 X |

FOREIGN PATENT DOCUMENTS

| | | |
|---|---|---|
| 347864 | 1/1979 | Austria . |
| 2420363 | 3/1978 | France . |
| 8236344 U | 9/1985 | Germany . |

Primary Examiner—Dennis L. Taylor
Attorney, Agent, or Firm—Barry R. Lipsitz

[57] ABSTRACT

A funnel structure for filtering and discharging storm sewage into an aquifer from a bottom of a manhole. The funnel is adapted to receive unitized filters. These filters can be selected from known materials to most effectively remove known types of contaminants from the storm sewage. The structure is designed to be employed both as a new installation, say within a park or a residential subdivision, to reduce leads on the storm sewage system and as an adaptation to existing manholes within a storm sewage collection system, thus augmenting the capacity of that system.

21 Claims, 4 Drawing Sheets

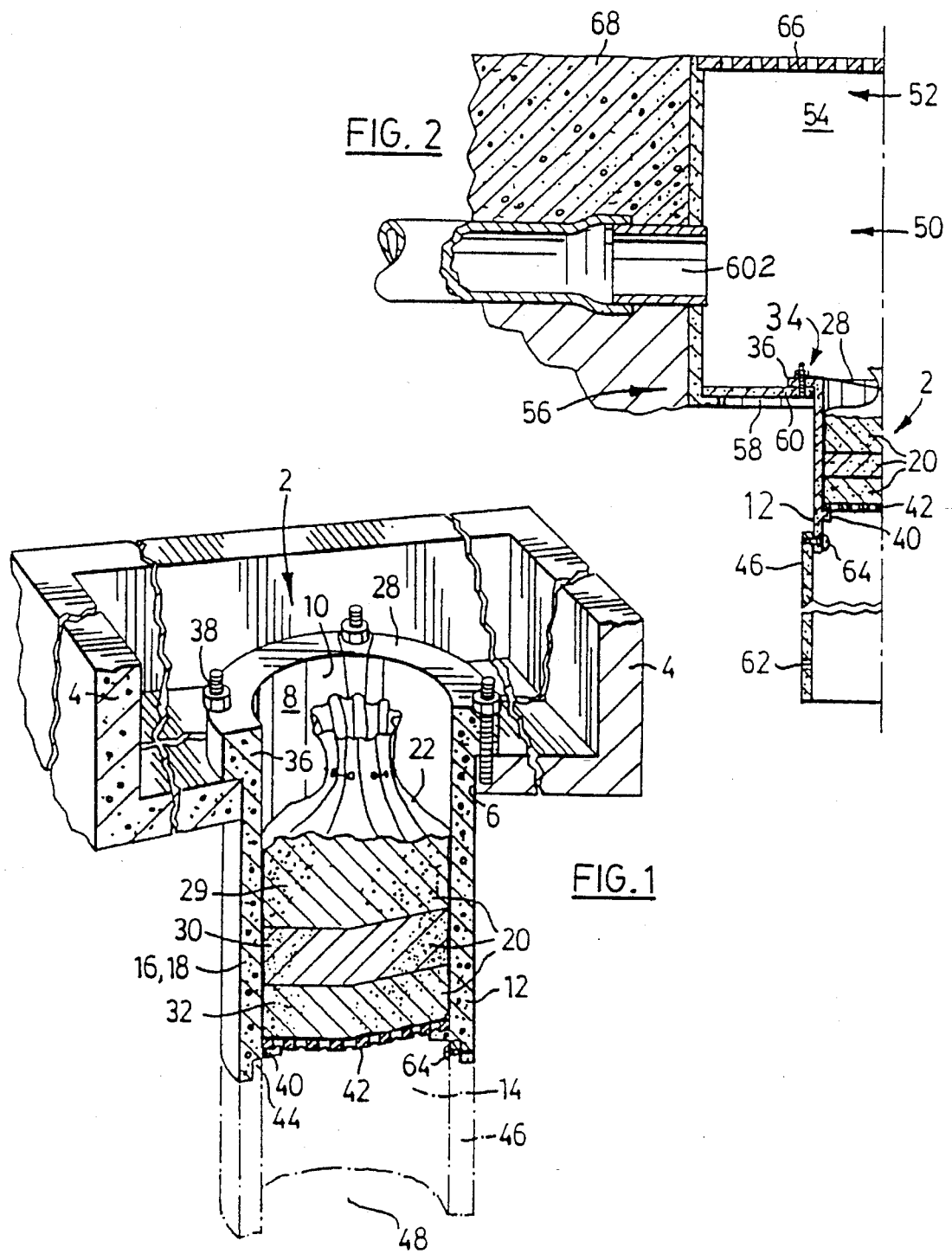

STORM WATER INFILTRATION

TECHNICAL FIELD

This invention relates to storm water or sewage disposal systems and more particularly to such systems that filter and discharge water into the ground.

BACKGROUND ART

Urban development necessarily covers a substantial proportion of the surface of the ground with buildings, adjacent parking areas and interconnecting roadways. Subsequent to a rainstorm the consequences of this development are manifested in higher peak runoff volumes, increased turbidity and pollution in runoff water, decreased water infiltration into the ground, increased pollution in receiving water bodies, flooding problems within waterways and even changes in the subsurface water level.

One study estimated that while 40% of rural rainfall was absorbed into the ground prior to urban development, as little as 10% of urban rainfall is now so absorbed.

Accordingly, the conveyance and disposition of increased and more polluted volumes of storm sewage is one of the major considerations that both a developer and an urban government must grapple with when contemplating urban development.

Storm sewage systems in the past have employed drainage wells to put storm water back into the ground. An example of this is shown in Austrian Patent No. AT-B-347 864. A filter is shown in this patent to avoid polluting the ground water. However, a long, vertical, tubular filter is disclosed which would easily plug-up, and in any event, the storm water would not be filtered uniformly because of the difference in static pressure or head from the bottom to the top of the filter.

German patent No. DE-U-8 236 344 shows a filter located in a well, but most of the filter is submerged and storm water is free to run over the top and bypass the filter. As a result, the filter would not be very effective.

DISCLOSURE OF INVENTION

According to the invention, there is provided a structure for filtering contaminated fluid comprising a surge basin for receiving the surface water and a filter funnel mounted to the surge basin. The funnel includes a top end having an intake opening for receiving the surface water from the surge basin, a central portion having sidewalls, and a bottom end having a discharge opening leading directly to the storm sewage receptor. A unitized filter means is positioned within the central portion of the funnel for removing contaminants from the surface water flowing therethrough. And the filter funnel includes filter support means positioned below a portion of the filter means for supporting the filter means in the filter funnel.

According to another aspect of the invention, there is provided a structure for filtering and discharging storm water into an aquifer characterized by a surge basin for receiving the storm water, a non-porous funnel tube mounted to the surge basin and disposed in a well hole leading to the aquifer, so that all storm water entering the aquifer passes through the funnel tube. The funnel tube has an intake opening and a discharge opening for discharging the storm water into the aquifer. A removable filter means is located in the funnel tube and extends transversely between the funnel tube sidewalls, so that all storm water entering the intake opening passes through the filter means to the discharge opening.

BRIEF DESCRIPTION OF DRAWINGS

This invention is illustrated in particular and in a preferred embodiments in which:

FIG. 1 is a perspective cross-sectional view of a structure for filtering a contaminated fluid;

FIG. 2 is a partial cross-sectional view of the structure of FIG. 1 located in a manhole;

MODES FOR CARRYING OUT THE INVENTION

Figure 3:
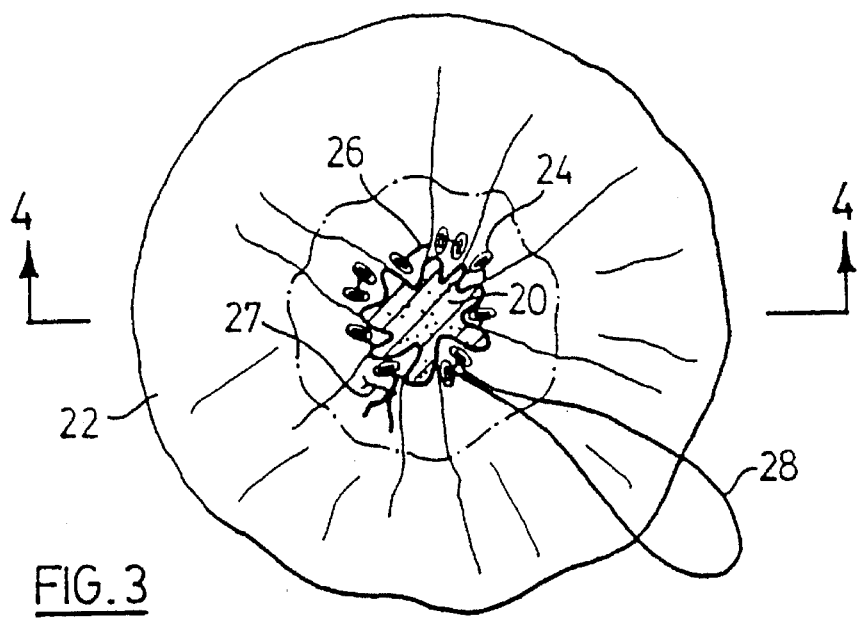
FIG. 3 is a plan view of a bag containing filter material.

FIG. 1 is a perspective cross-sectional view, of a structure for filtering a contaminated fluid. A filter funnel 2 is shown positioned in a supporting structure 4, hereinafter alternatively referred to as a "surge basin". The surge basin 4 is designed so that storm sewage will collect therein and drain into the filter funnel. The dimensions of the surge basin 4 are such so as to be able to hold the first flush of storm sewage, i.e. the first few centimeters of rain which contain a majority of the pollution carried away by rain waters, without causing undue flooding. In applications where the filter funnel 2 is not intended to receive significant flushes of water, such as in an industrial plant or level parking lot, the support structure 4 can be relatively shallow. The supporting structure 4 is intended to include a relatively flat surface such as a garage floor or a concave surface that might be poured in a park which receives storm sewage after a rainfall. The supporting structure 4 has a circular opening 6 therein dimensioned to receive the filter funnel 2. The filter funnel 2 has a top end 8 having an intake opening 10. It also has a bottom end 12 and a discharge opening 14. A central portion 16 has sidewalls 18. A filter means 20 is shown within the central portion 16. The distance from the intake opening 10 to the filter means 20, or, viewed another way, the length and diameter of the filter funnel 2, can be varied in accordance with the water holding volume of the surge basin 4. It will also be appreciated that the surge basin 4 can be made integral with the filter funnel 2.

FIG. 1 shows the filter means 20 having three porous sacks of filtration material. Each one of these three sacks is of the type shown in FIGS. 3 and 4. The number of sacks and the filtration material they contain may be varied to suit the needs of the application. A porous sack 22 is shown having grommets 24 through its top. A light rope 26 is threaded through the grommets 24. The rope 26 is of sufficient length that it may serve as a handle 28 to lift the sack 22 from the central portion 16. A clip or tie 27 in the rope 26 may be required to secure the closure of the sack 22. The porous sacks 22 allow granular filtration material 20 to be easily inserted and removed as a unit from the central portion 16. When lifted the sacks elongate, allowing them to enter the intake opening 10 of the filter funnel 2. When in position the bags flatten, fully filling the central portion 16. Filter sacks 22 may contain different filtration media. Such filtration media would be selected from those generally available to remove a known contaminant. Pea gravel 29 might be chosen to remove the coarsest contaminants. Sand 30 might be chosen to remove finer contaminants which were not filtered out by the pea gravel 29. Charcoal 32 might be used to remove the finest of impurities from the fluid.

A mounting means 34 (see FIG. 2) is shown on the top end 8 of the filter funnel 2. The preferred mounting means is a rim 36. Bolts 38 may be used to secure the rim 36 in position. The bottom end 12 of the filter funnel 2 has a bottom rim 40 projecting horizontally inwards from the sidewalls 18. The bottom rim 40 supports a grate 42 positioned thereon.

The filtration material 20 in sack 22 rests on the grate 42. The discharge opening 14 of the filter funnel 2 preferably leads to a well hole 48 that terminates at a storm sewage receptor, such as an aquifer (not shown), which is a porous layer of the strata located above or below the water table that is amenable to directing water thereto. Alternatively, if replenishing the water table is impractical or undesired, the receptor may be the municipal storm sewer system or the like which typically eventually terminates at a large body of water. The well hole 48 may be cased or uncased. It may be left open or filled with gravel. It is however suggested that a top portion of the well hole 48 be cased. Towards this end, a groove 44 around the bottom end 12 of the filter funnel 2 is dimensioned to receive a well-hole casing 46 shown in broken lines. Screws 64 around the bottom end 12 may be used to fasten the casing 46 to the bottom end 12.

FIG. 2 is a partial cross-sectional view of the type of structure shown in FIG. 1 located in a supplementary funnel such as a manhole 50, which would most likely be constructed from concrete. The manhole 50, as is usually the case, is sufficiently large so as to hold the first storm flush, as described above. The supplementary funnel shown is a manhole 50. Alternatively the supplementary funnel may be enlarged so that it comprises a reservoir (not shown). The manhole 50 has a top end 52 having an upper opening 54 and a bottom end 56 having a lower opening 58. The lower opening 58 is positioned around the top end 8 of the filter funnel 2.

A bottom wall 60 of the supplementary funnel, or a portion thereof, may be made of concrete poured on site in order to best fit the varying location of the well hole 48. The supplementary funnel shown is the manhole 50 having a horizontal fluid discharge tube 602 therein. The discharge tube 602 may connect to the sewer system, or, in the absence thereof to a plurality of structures 2 of the present invention, in order to balance the load of storm sewage being filtered per given structure 2.

The well casing 46 is shown with a perforation 62 therethrough. One would choose to perforate the casing at a porous ground layer above or below the water table thereby choosing the zone of infiltration. In FIG. 2, the well hole casing 46 surrounds the bottom end 12 of the filter funnel 2. Screws 64 are used to fasten the bottom end 12 of the filter funnel 2 to the well hole casing 46. A top grate 66 is used to cover the upper opening 54 in the top end 52 of the manhole 50. The top grate 66 may be chained or hinged to the manhole 50 for safety reasons. If the manhole 50 is beneath a roadway 68 the top grate 66 will have to be heavier.

Figure 4:
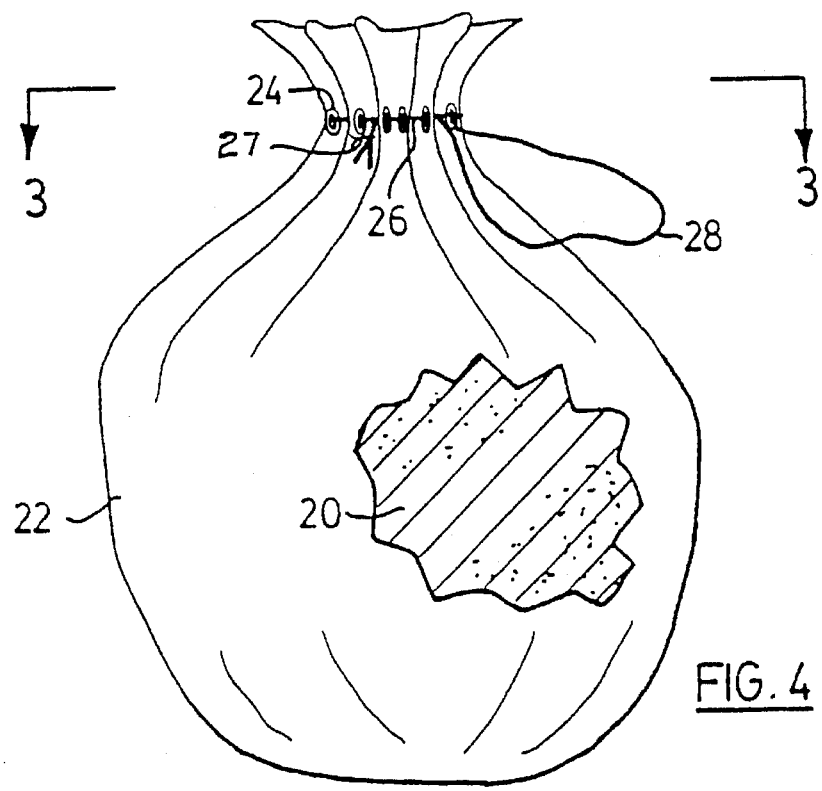
FIG. 4 is an elevational view, partly broken away, of the bag shown in FIG. 3.

FIG. 3 is a plan view of a porous sack 22 containing filter means 20. An elevational view, partly broken away, of the porous sack 22 is shown in FIG. 4. A rope 26 is strung between grommets 24 around the end of the porous sack 22. The end is pulled closed and a tie 27 is used to hold it closed. A length of rope 26 provides a handle 28.

Figure 5:
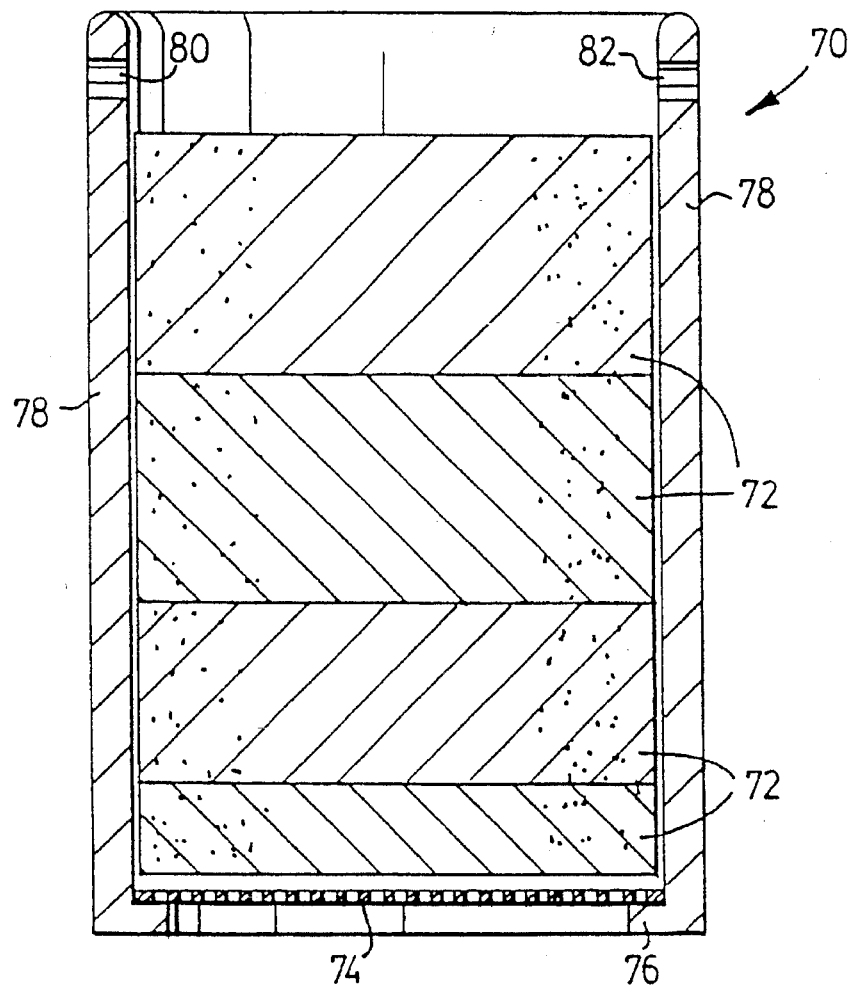
FIG. 5 is a cross-sectional view of a filter basket for multiple filters.

FIG. 5 is a cross-sectional view of a filter basket 70 for multiple filters 72. The basket enables the filter means to be removed as a unit. The filter basket 70 is sized to removably fit within the central portion 16 of the filter funnel 2. The basket 70 has a porous bottom 74. The porous bottom 74 shown is supported by a bottom peripheral rim 76. The basket has a top portion 78 which is adapted to receive a lifting means. The lifting means shown are opposed openings 80,82 suitable to receive a hook 92 as shown in FIG. 8.

Alternatively, the lifting means might comprise a bar (not shown) removably affixed between said opposed openings 80, 82. Said bar would have an elevated central portion to ensure balanced lifting when it was hooked onto.

Figure 6:
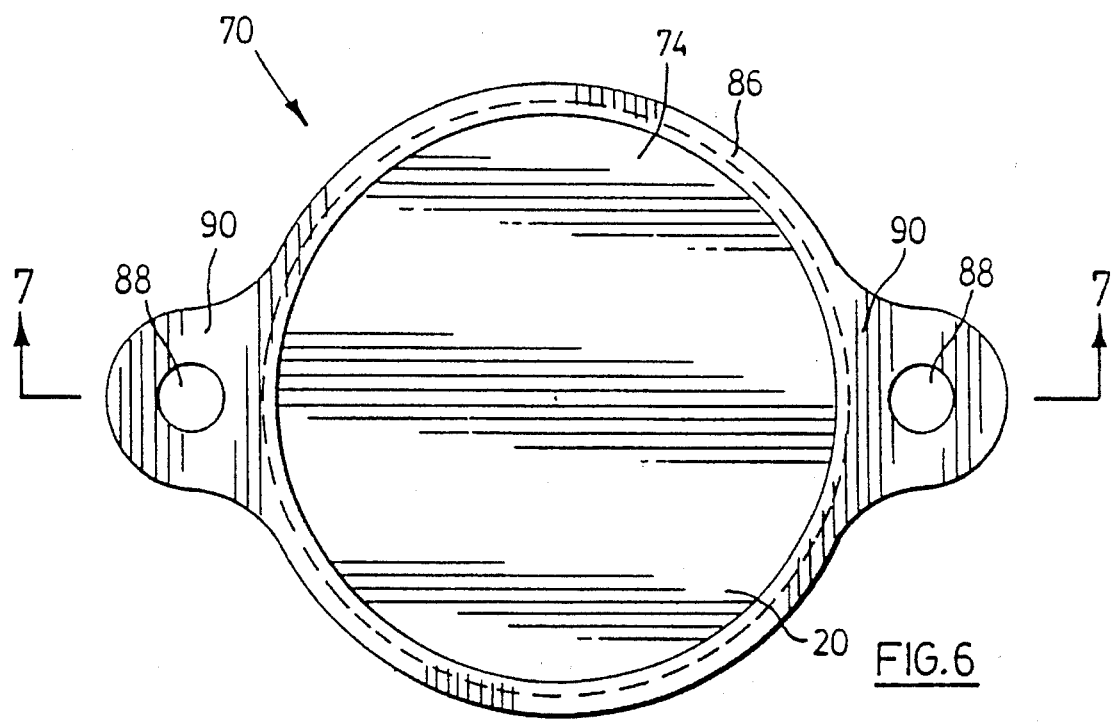
FIG. 6 is a plan view of a filter basket for a singular filter material.
Figure 7:
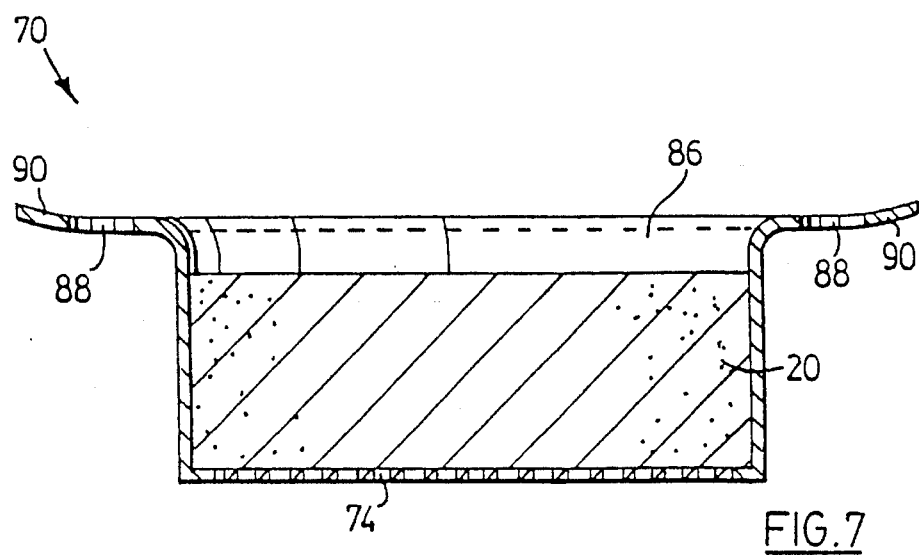
FIG. 7 is a cross-sectional view taken along lines "7—7" of in FIG. 6.

FIG. 6 & FIG. 7 respectively, are a plan view and a cross-sectional view of a different type of filter basket 70. This filter basket 70 does not require a bottom rim 40 or grate 42 to support it in the filter funnel 2. Like the type of filter basket shown in FIG. 5, it has a porous bottom 74 and is sized to fit within the central portion 16 of a filter funnel 2. It is supported by a top peripheral rim 86 which is too large to fit in the central portion 16. The top peripheral rim 86 is adapted to receive a lifting means. The adaption shown is diametrically opposed openings 88 in extended portions 90 of the top peripheral rim 86. A filter means 20 is shown within the basket 70.

Figure 8:
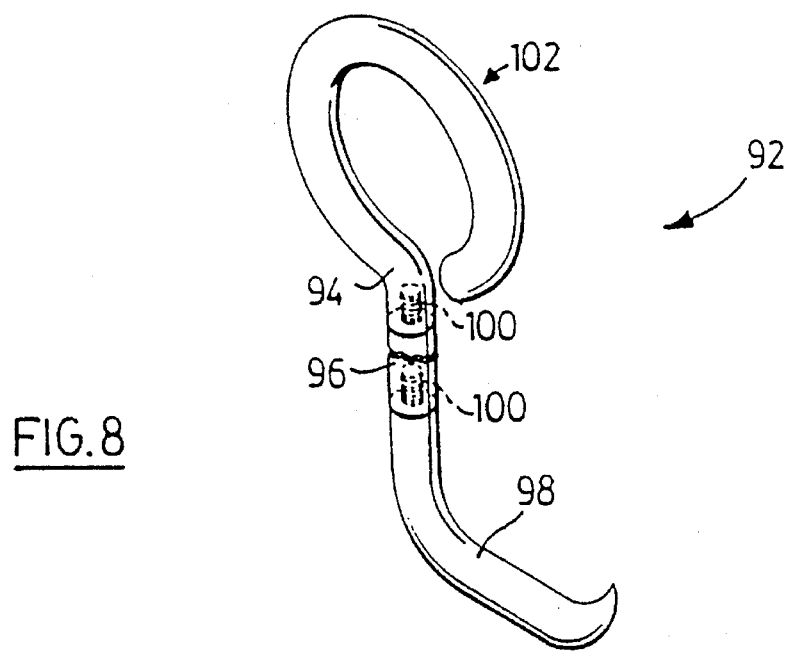
FIG. 8 is a perspective view of a hook assembly.

FIG. 8 shows a hook 92 which has a top portion 94, one or more central portions 96 and a bottom portion 98. Said portions are threaded together by screw threads 100. The top portion 94 is provided with a ring 102 suitable for a rope or a hook of a crane. The central portion 96 is a bar with one end having screw thread 100 projecting therefrom and the other end adapted to receive a similar threaded member. The bottom portion 98 is bent in the shape of a hook. It is suitable to fit within openings 80, 82 on the filter basket 70.

Having described preferred embodiments, it will be appreciated that the structure's minimal surface area requirements, and its ease of filter servicing make its use practicable as part of a storm sewage system when land is subdivided for residential use, or as an upgrade to existing storm sewage systems where commercial development intensifies the demands on existing storm sewage systems. It is expected that the invention would be preferred where a falling water table is a real concern as well as in ecologically concerned communities.

What is claimed is:

1. A structure for filtering and discharging surface water and storm sewage into a storm sewage receptor, comprising:

a surge basin for receiving said surface water;

a filter funnel mounted to the surge basin, the funnel including a top end having an intake opening for receiving said surface water from said surge basin, a central portion having sidewalls and a bottom end having a discharge opening leading directly to the storm sewage receptor;

a filter means including a porous sack of filtration material positioned within the central portion of the funnel for removing contaminants from the surface water flowing therethrough, said sack of filtration material being adapted flatten when supported from below to prevent the by-pass surface water therearound; and the filter funnel including filter support means positioned below a portion of the filter means for supporting the filter means in the filter funnel.

2. A structure as claimed in claim 2 wherein said storm sewage receptor is a well hole leading to an aquifer.

3. A structure as claimed in claim 2 wherein said surge basin has an aperture formed therein; and wherein the top end of said funnel comprises a rim projecting outwards for mounting the funnel in said aperture.

4. A structure as claimed in claim 3 wherein said filter support means comprises a bottom rim projecting inwards from the sidewalls, and a grate positioned thereon.

5. A structure as claimed in claim 3 wherein said support means comprises a filter basket, having a porous bottom and a top peripheral rim, the porous bottom being sized to removably fit within said central portion, said rim having an outwardly projecting flange which is too large to fit within said central portion, said rim being adapted to receive a lifting means.

6. A structure as claimed in claim 3 wherein said utilized filter means comprise a filter basket sized to removably fit within said central portion, having a porous bottom and a top portion adapted to receive lifting means.

7. A structure as in claim 2 wherein said well hole comprises a well casing and the bottom end of the funnel includes a groove therearound, sized to receive a top end of the well casing.

8. A structure as claimed in claim 3 further comprising a top grate covering the (upper opening) aperture in said surge basin.

9. A structure as claimed in claim 1 wherein the surge basin is a manhole.

10. A structure as claimed in claim 9 wherein the manhole is adapted to receive a horizontal fluid discharge tube.

11. A structure for filtering and discharging storm water into an aquifer characterized by a surge basin for receiving said storm water; a non-porous funnel tube mounted to said surge basin and disposed in a well hole leading to the aquifer so that all storm water entering the aquifer passes through the funnel tube, the funnel tube having an intake opening for receiving the storm water from the surge basin, and a discharge opening for discharging said storm water into the aquifer; removable filter means located in the funnel tube, the filter means including granular filtration material adapted to flatten out therein, so that no storm water entering the intake opening by-passes the filter means to the discharge opening.

12. A structure as claimed in claim 11 characterized by the fact that the filter means is a closed porous sack of filtration material supported on a transverse grate extending between the funnel tube sidewalls.

13. A structure as defined in claim 11 characterized by the fact that the filter means is a plurality of vertically arranged closed porous sacks of filtration material supported on a transverse grate extending between the funnel tube sidewalls.

14. A structure as claimed in claim 13 characterized by the fact that each of said sacks contains a different filtration material.

15. A structure as claimed in claim 11 characterized by the fact that the filter means is a porous sack of filtration material contained in a filter basket slidably mounted in the funnel tube and held in position by support means.

16. A structure as claimed in claim 15 characterized by the fact that the filter basket contains a plurality of separate filters.

17. A structure as claimed in claim 15 characterized by the fact that the filter basket has a porous bottom wall and lifting means for removing the basket.

18. A structure as claimed in claim 11 characterized by the fact that a well casing is located in the well hole, the funnel tube being mounted on the top end of the well casing.

19. A structure as claimed in claim 18 characterized by the fact that the well casing has a perforation formed in the wall thereof at a preselected height.

20. A system for augmenting the capacity of a sewage system having a plurality of manholes leading thereto comprising a plurality of structures as claimed in claim 10, the structures being disposed at the bottom of various manholes throughout the sewage system.

21. A system for augmenting the capacity of a sewage system comprising a plurality of structures as claimed in claim 2 disposed in parallel with the sewage system and unconnected therewith.

* * * * *